April 21, 1931. H. D. CAMPBELL 1,801,846
NUT LOCK MEANS
Filed Oct. 12, 1928
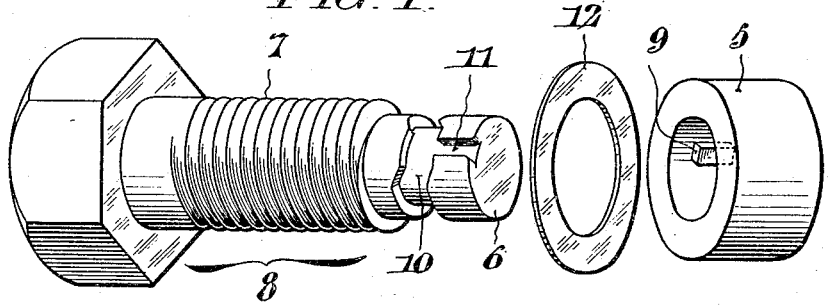
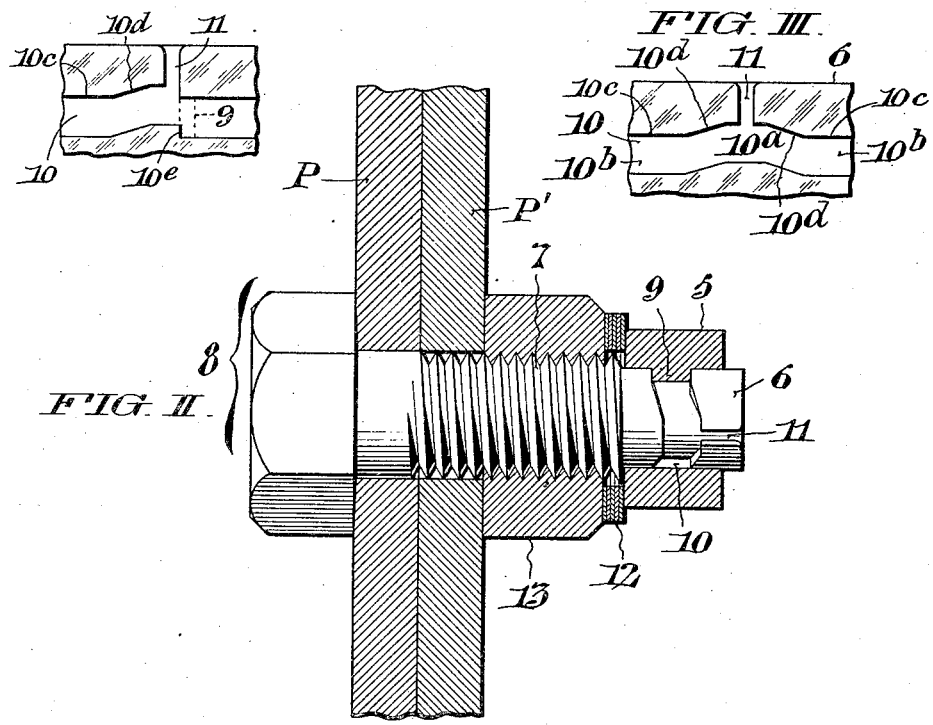
WITNESSES
John A. Weidler
William Bell
INVENTOR:
Howard D. Campbell,
BY Fraley Paul
ATTORNEYS.

Patented Apr. 21, 1931

1,801,846

UNITED STATES PATENT OFFICE

HOWARD D. CAMPBELL, OF MERCHANTVILLE, NEW JERSEY

NUT-LOCK MEANS

Application filed October 12, 1928. Serial No. 312,139.

This invention relates to means useful with screw bolts to lock nuts associated with them against loosening after having once been secured.

The object of my invention is to attain a positive and dependable nut locking action through provision of a means which is simple in construction, conducive to economic manufacture in quantity, and capable of ready and quick manipulation incidental to application of the bolts.

How the foregoing advantages may be readily attained in practice will be manifest from the detailed description which follows in connection with the drawings, wherein Fig. I is an exploded perspective view showing the parts embodied in my improved nut lock means.

Fig. II is an illustration showing the manner in which the lock nut means is used.

Fig. III shows a linear development of a cam groove constituting a feature of the lock nut means; and, Fig. IV is a view similar to Fig. III showing a slight modification of my invention.

As herein delineated, my invention comprises a jamb collar 5 of a size to fit over the end 6 of the threaded shank 7 of the screw bolt 8, said end being in the present instance turned smooth and reduced to a diameter corresponding substantially to that at the insides of the threading. The collar 5 has an inward projection or lug 9 to engage a circumferential wedge cam groove 10 around the reduced end 6 of the bolt shank 7, entry into said groove being by way of a notch 11. As shown to best advantage in Fig. III, the groove 10 has parallel portions 10a, 10b in slightly spaced planes, the latter of the two portions affording a rest ledge 10c with inclined cam wedge approaches at 10d. The nomenclature employed in connection with these parts is indicative of their function in the manner presently disclosed.

The lock means further embodies shims 12 which are stamped or otherwise fashioned to thin annular or washer-like configuration from metal capable of yielding to compression—for example, soft steel or iron, bronze or brass. As shown, the outer diameter of these shims 12 is preferably made equal to that of the nut 13 (Fig. II) which is associated with the bolt 8 and which is to be locked, while the aperture is so proportioned as to enable easy slipping over the bolt shank 7.

Fig. II typifies, for the purposes of illustration, the use of the bolt 8 in securing together a pair of plates P, P'. After placement of the bolt 8 and tightening of the associated nut 13 in the usual way, a number of the shims 12 are superimposed upon the nut 13, and the jamb collar 5 applied to the protruding end 6 of the bolt shank 7, the inward projection 9 of said collar being passed to the portion 10a of the groove 10 via the notch 11. The jamb collar 5 is thereupon turned either to the right or left with the aid of a Stillson wrench or the like to the end that the shims 12 are compressed by enforced axial advance of said collar induced through cooperation of the projection 9 with one of the cam wedge inclinations 10d of the groove 10, the maximum compression being attained and held when the projection is finally engaged behind the rest ledge 10c of said groove. As a consequence of the jamb action induced as just described, it will be apparent that the nut 13 is positively secured against the possibility of turning of its own accord subsequently. The number of shims 12 necessary vary of course with each individual bolt application, and is obviously determinable by trial only.

It is also obvious that screw bolts modified in accordance with my invention may be made in different sizes and proportions to suit various requirements of practice.

Fig. IV shows a slight modification in which compression of the shims 12 is possible by rotation of collar 5 in one direction only. In this instance, therefore, the ledge 10c is provided with but a single wedge approach 10d, while the shoulder 10e formed as a consequence of the modified construction, co-acts with the lug 9, as shown in dotted lines in Fig. IV, to limit the rotation of the collar 5 about the end 6 of the bolt shank 8.

Having thus described my invention, I claim:

1. Nut lock means useful with screw bolts including a jamb collar having an inward projection to engage a circumferential groove formed in the reduced end of the bolt shank beyond the associated nut which is to be locked, and said groove forming a rest ledge embodying parallel portions in spaced relation with opposedly inclined cam wedge approaches, and a common entrant notch for said groove.

2. Nut lock means useful with screw bolts including a jamb collar having an inward projection to engage a circumferential groove formed in the reduced end of the bolt shank beyond the associated nut which is to be locked, said reduced portion being of a diameter substantially approximating that at the bottom of the screw-threading, and said groove forming a rest ledge embodying parallel portions in slightly spaced relation with opposedly inclined cam wedge approaches, and a common entrant notch for said groove.

3. Nut lock means useful with screw bolts including a jam collar having an inward projection to engage a circumferential groove formed in the reduced end of the bolt shank beyond the associated nut which is to be locked, said reduced portion being af a diameter substantially approximating that at the bottom of the screw-threading, said groove forming a rest ledge embodying parallel portions in slightly spaced relation with a movement limiting shoulder and an inclined cam wedge approach, and a common entrant notch for the groove.

In testimony whereof, I have hereunto signed my name at Philadelphia, Pennsylvania, this 9th day of October, 1928.

HOWARD D. CAMPBELL.